(12) United States Patent
Schoenhaber et al.

(10) Patent No.: US 12,410,741 B2
(45) Date of Patent: Sep. 9, 2025

(54) EXHAUST GAS PURIFICATION SYSTEM FOR PURIFYING EXHAUST GASES OF GASOLINE ENGINES

(71) Applicant: UMICORE AG & CO. KG, Hanau-Wolfgang (DE)

(72) Inventors: Jan Schoenhaber, Darmstadt (DE); Joerg-Michael Richter, Frankfurt (DE); Carolin Braun, Langen (DE); Tim Palm, Ronneburg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 18/580,581

(22) PCT Filed: Jul. 20, 2022

(86) PCT No.: PCT/EP2022/070289
§ 371 (c)(1),
(2) Date: Jan. 18, 2024

(87) PCT Pub. No.: WO2023/001865
PCT Pub. Date: Jan. 26, 2023

(65) Prior Publication Data
US 2024/0369009 A1    Nov. 7, 2024

(30) Foreign Application Priority Data
Jul. 21, 2021    (DE) .......................... 102021118803.2

(51) Int. Cl.
F01N 13/00    (2010.01)
F01N 3/10    (2006.01)

(52) U.S. Cl.
CPC .......... *F01N 13/009* (2014.06); *F01N 3/101* (2013.01); *F01N 2610/03* (2013.01)

(58) Field of Classification Search
CPC .... F01N 13/009; F01N 3/101; F01N 2610/03; F01N 13/0093; F01N 3/0828; F01N 2370/04; F01N 2570/18; F01N 3/0814
See application file for complete search history.

(56) References Cited

U.S. PATENT DOCUMENTS 5,120,695 A    6/1992    Blumrich et al.
6,468,941 B1   10/2002   Bortun et al.
(Continued)

FOREIGN PATENT DOCUMENTS

DE    10023439 A1    11/2001
DE    102010046762 A1    3/2011
(Continued)

OTHER PUBLICATIONS

Non Final Office Action mailed Jul. 18, 2024 in U.S. Appl. No. 18/580,496 (12 pages).
(Continued)

Primary Examiner — Matthew T Largi
(74) Attorney, Agent, or Firm — Smith, Gambrell & Russell, LLP

(57) ABSTRACT

The invention is directed to the purification of exhaust gases of an internal combustion engine operated predominantly with a stoichiometric fuel mixture. The exhaust gas system has in particular 4 purification functions in a particular order. A three-way catalyst (TWC1) near the engine is followed by a gasoline particle filter (GPF) and another three-way catalyst (TWC2) downstream thereof. The system additionally includes a hydrocarbon storage function.

18 Claims, 2 Drawing Sheets

(56) References Cited

U.S. PATENT DOCUMENTS

Figure 1:
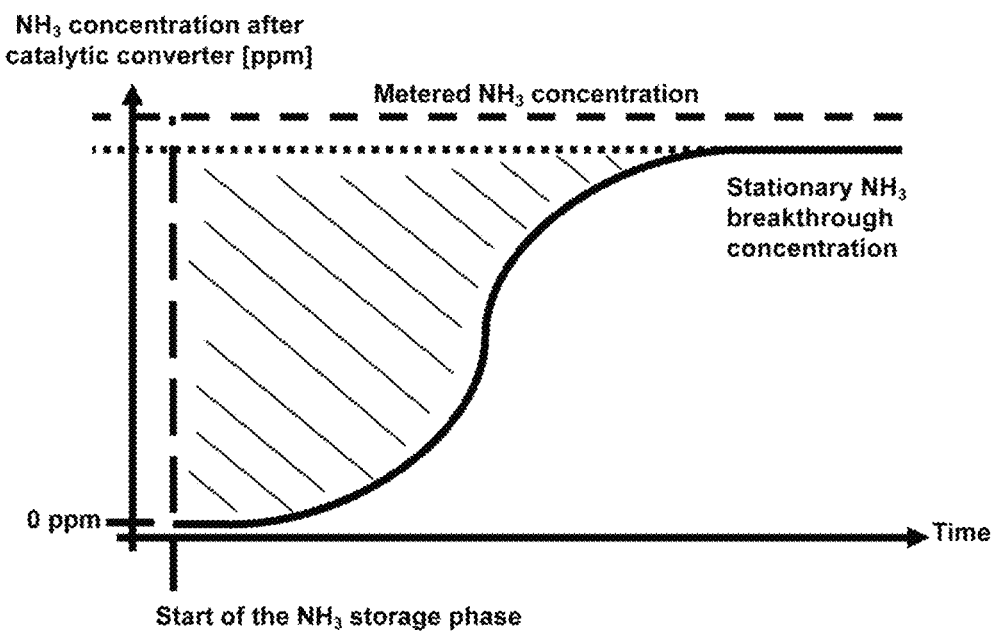

| | | |
|---|---|---|
| 6,585,944 B1 | 7/2003 | Nunan et al. |
| 6,729,129 B2 | 5/2004 | Yamamoto et al. |
| 6,938,411 B2 | 9/2005 | Hoffmann et al. |
| 7,984,609 B2 | 7/2011 | Döring et al. |
| 8,066,963 B2 | 11/2011 | Klingmann et al. |
| 8,158,551 B2 | 4/2012 | Verdier et al. |
| 8,277,880 B2 | 10/2012 | Sato et al. |
| 8,341,947 B2 | 1/2013 | Hepburn et al. |
| 8,398,943 B2 | 3/2013 | Döring et al. |
| 8,464,522 B2 | 6/2013 | Fujiwara et al. |
| 8,617,497 B2 | 12/2013 | Adelmann et al. |
| 8,663,588 B2 | 3/2014 | Lindner et al. |
| 8,776,500 B2 | 7/2014 | Gonze et al. |
| 9,517,462 B2 | 12/2016 | Roesch et al. |
| 9,957,911 B2 | 5/2018 | Sczomak et al. |
| 10,066,576 B2 | 9/2018 | Gwidt et al. |
| 10,072,549 B2 | 9/2018 | Inaguma et al. |
| 10,156,175 B1* | 12/2018 | Hattar .................. F01N 9/002 |
| 10,279,313 B2 | 5/2019 | Gabrielsson |
| 10,323,593 B2* | 6/2019 | Ball .................. F01N 3/2073 |
| 10,413,886 B2 | 9/2019 | Despres et al. |
| 10,914,217 B2 | 2/2021 | Joo et al. |
| 11,073,057 B2 | 7/2021 | Joo et al. |
| 11,179,676 B2 | 11/2021 | Schoenhaber et al. |
| 11,185,820 B2 | 11/2021 | Schoenhaber et al. |
| 11,220,942 B2 | 1/2022 | Hupfeld et al. |
| 11,291,952 B2 | 4/2022 | Schoenhaber et al. |
| 11,305,269 B2 | 4/2022 | Deibel et al. |
| 2001/0006934 A1* | 7/2001 | Kachi .................. B01J 23/63 |
| | | 422/177 |
| 2004/0101453 A1* | 5/2004 | Fujiwara ............. F01N 3/0814 |
| | | 422/177 |
| 2005/0282698 A1 | 12/2005 | Southward et al. |
| 2006/0010857 A1 | 1/2006 | Hu et al. |
| 2009/0193796 A1* | 8/2009 | Wei .................. F01N 3/0814 |
| | | 60/299 |
| 2010/0107606 A1 | 5/2010 | Narayanaswamy et al. |
| 2011/0072784 A1* | 3/2011 | Hepburn ................ F01N 3/101 |
| | | 60/285 |
| 2011/0073088 A1* | 3/2011 | Hubbard ................ F01N 3/021 |
| | | 123/703 |
| 2011/0120089 A1* | 5/2011 | Koch .................. F01N 3/035 |
| | | 60/297 |
| 2011/0202253 A1 | 8/2011 | Perry et al. |
| 2011/0271664 A1 | 11/2011 | Boorse et al. |
| 2015/0107228 A1 | 4/2015 | Klingmann et al. |
| 2015/0132188 A1 | 5/2015 | Howard |
| 2015/0266002 A1 | 9/2015 | Biberger et al. |
| 2016/0051931 A1 | 2/2016 | Ito et al. |
| 2016/0228852 A1 | 8/2016 | Biberger et al. |
| 2016/0245207 A1 | 8/2016 | Ball et al. |
| 2017/0014766 A1 | 1/2017 | Schoenhaber et al. |
| 2017/0274321 A1* | 9/2017 | Zheng ................ B01J 37/0244 |
| 2018/0038252 A1 | 2/2018 | Yang et al. |
| 2018/0080357 A1 | 3/2018 | Jung et al. |
| 2018/0230882 A1 | 8/2018 | Ghoniem et al. |
| 2018/0318763 A1 | 11/2018 | Biberger et al. |
| 2018/0347425 A1 | 12/2018 | Otsuka et al. |
| 2019/0120109 A1 | 4/2019 | Clark et al. |
| 2019/0351393 A1 | 11/2019 | Nunan et al. |
| 2019/0351397 A1 | 11/2019 | Nunan et al. |
| 2019/0351398 A1 | 11/2019 | Nunan et al. |
| 2019/0353067 A1 | 11/2019 | Moser et al. |
| 2020/0157995 A1* | 5/2020 | Paukner .................. F01N 3/36 |
| 2020/0309004 A1* | 10/2020 | Tyo .................. F01N 13/009 |
| 2020/0378286 A1 | 12/2020 | Hengst et al. |
| 2021/0162382 A1 | 6/2021 | Hengst et al. |
| 2021/0236976 A1 | 8/2021 | Foerster et al. |
| 2022/0168721 A1 | 6/2022 | Schoenhaber et al. |
| 2022/0176355 A1 | 6/2022 | Kucerova et al. |
| 2022/0176364 A1 | 6/2022 | Schoenhaber et al. |
| 2022/0213826 A1* | 7/2022 | Suchta .................. F01N 3/0835 |

FOREIGN PATENT DOCUMENTS

| | | |
|---|---|---|
| DE | 102013211387 A1 | 12/2013 |
| DE | 102017102393 A1 | 8/2017 |
| DE | 102016112657 A1 | 1/2018 |
| DE | 102018108346 A1 | 10/2019 |
| DE | 102019204744 A1 | 8/2020 |
| DE | 102019219115 A1 | 6/2021 |
| EP | 0 324 082 A1 | 7/1989 |
| EP | 0 885 650 A2 | 12/1998 |
| EP | 1 046 423 A2 | 10/2000 |
| EP | 1 541 220 A1 | 6/2005 |
| EP | 1 657 410 A2 | 5/2006 |
| EP | 1 726 359 A1 | 11/2006 |
| EP | 1 876 331 A2 | 1/2008 |
| EP | 1 882 832 A2 | 1/2008 |
| EP | 1 892 395 A1 | 2/2008 |
| EP | 1 921 044 A2 | 5/2008 |
| EP | 2 007 682 A1 | 12/2008 |
| EP | 2 042 226 A2 | 4/2009 |
| EP | 1 974 809 B1 | 9/2010 |
| EP | 1 900 416 B1 | 4/2011 |
| EP | 3 045 226 A1 | 7/2016 |
| EP | 3 247 493 A1 | 11/2017 |
| EP | 3 298 252 A1 | 3/2018 |
| EP | 3 536 919 A1 | 9/2019 |
| EP | 3 595 796 A1 | 1/2020 |
| EP | 3 484 602 B1 | 2/2020 |
| EP | 3 639 908 A1 | 4/2020 |
| EP | 3 639 919 A1 | 4/2020 |
| EP | 3 695 902 A1 | 8/2020 |
| EP | 3 642 460 B1 | 2/2021 |
| WO | 95/35152 A1 | 12/1995 |
| WO | 2004/076829 A1 | 9/2004 |
| WO | 2008/000449 A2 | 1/2008 |
| WO | 2009/012348 A1 | 1/2009 |
| WO | 2011/110919 A1 | 9/2011 |
| WO | 2011/131324 A1 | 10/2011 |
| WO | 2012/135871 A1 | 10/2012 |
| WO | 2012/175409 A1 | 12/2012 |
| WO | 2015/121910 A1 | 8/2015 |
| WO | 2016/057285 A1 | 4/2016 |
| WO | 2017/082563 A1 | 5/2017 |
| WO | 2017/153239 A1 | 9/2017 |
| WO | 2018/069199 A1 | 4/2018 |
| WO | 2008/106518 A2 | 9/2018 |
| WO | 2008/106519 A1 | 9/2018 |
| WO | 2019/121375 A1 | 6/2019 |
| WO | 2019/121994 A1 | 6/2019 |
| WO | 2019/121995 A1 | 6/2019 |
| WO | 2019/134958 A1 | 7/2019 |
| WO | 2020/058265 A1 | 3/2020 |
| WO | 2020/069548 A1 | 4/2020 |
| WO | 2020/200394 A1 | 10/2020 |
| WO | 2020/200397 A1 | 10/2020 |
| WO | 2020/200398 A1 | 10/2020 |
| WO | 2023/001617 A1 | 1/2023 |
| WO | 2023/001863 A1 | 1/2023 |

OTHER PUBLICATIONS

Non Final Office Action mailed Jul. 18, 2024 in U.S. Appl. No. 18/580,561 (11 pages).
Translation of the Written Opinion of the International Searching Authority mailed Nov. 7, 2022 for International Patent Application No. PCT/EP2022/070289 (7 pages).
International Preliminary Report on Patentability mailed Jan. 18, 2024 for International Patent Application No. PCT/EP2022/070289 (7 pages in German; 8 pages English translation).
International Search Report dated Nov. 7, 2022 for International Patent Application No. PCT/EP2022/070289 (4 pages in German; 3 pages English translation).
Written Opinion of the International Searching Authority dated Nov. 7, 2022 for International Patent Application No. PCT/EP2022/070289 (6 pages in German).
DIN 66133. Jun. 1993, Bestimmung der Porenvolumenverteilung und der spezifischen Oberfläche von Feststoffen durch

(56) References Cited

OTHER PUBLICATIONS

Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
Meier, W.M. Zeolites and zeolite-like materials. Pure and Applied Chemistry. 1986. vol. 58, No. 10, pp. 1323-1328.
Lupescu. Jason, et al. A New Catalyzed HC Trap Technology that Enhances the Conversion of Gasoline Fuel Cold-Start Emissions. SAE Int. J. Fuels Lubr 2018. vol. 11(4), pp. 411-425.
U.S. Appl. No. 18/580,496, filed Jan. 18, 2024, Schoenhaber et al.
U.S. Appl. No. 18/580,561, filed Jan. 18, 2024, Schoenhaber et al.
Notice of Allowance mailed Aug. 20, 2024 in U.S. Appl. No. 18/580,496 (8 pages).

\* cited by examiner

EXHAUST GAS PURIFICATION SYSTEM FOR PURIFYING EXHAUST GASES OF GASOLINE ENGINES

The present invention relates to the purification of exhaust gases of an internal combustion engine predominantly operated with a stoichiometric fuel mixture. An exhaust system has in particular 4 cleaning functions in a specific sequence. A TWC1 (three-way catalytic converter) close to the engine is followed by a GPF (gasoline particle filter), and by an additional TWC2 arranged downstream. The system additionally has a functionality for storing hydrocarbons.

Exhaust gases of combustion engines, i.e., gasoline- or natural gas-fueled engines, operated predominantly (>50% of the operating time) with stoichiometric air/fuel mixtures, are purified in conventional methods with the aid of three-way catalysts (TWC). Such catalysts are capable of simultaneously converting the three major gaseous pollutants of the engine, namely hydrocarbons, carbon monoxide and nitrogen oxides, into harmless components. "Stoichiometric" means that on average exactly as much air is available for combustion of the fuel present in the cylinder as is required for complete combustion. The combustion air ratio λ (air/fuel ratio) expresses the proportion of air mass $m_{L,tats}$ which is actually available for combustion in relation to the stoichiometric air mass $m_{L,st}$:

$$\lambda = \frac{m_{L,tats}}{m_{L,st}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement)=1.1 means that 10% more air is present than would be required for the stoichiometric reaction.

In general, platinum-group metals, particularly platinum, palladium and rhodium—for example, configured on γ-aluminum oxide as a carrier—are used as catalytically-active materials. In addition, three-way catalysts contain oxygen storage materials, e.g., cerium/zirconium mixed oxides. In the latter case, cerium oxide, a rare earth metal oxide, constitutes the component that is fundamental to the oxygen storage. Along with zirconium oxide and cerium oxide, these materials may contain additional components, such as further rare earth metal oxides or alkaline earth metal oxides. Oxygen storage materials are activated by applying catalytically-active materials, such as platinum group metals, and therefore also serve as support material for the platinum group metals.

Such catalytically active materials together with their contained substances are applied by a coating process to, for example, flow-through substrates. After the substrates are dried and calcinated, they can be installed in the exhaust system. Flow-through substrates are made of ceramic materials, such as silicon carbide, aluminum titanate, and cordierite, and are considered to be tried and tested. They are made up of a large number of parallel channels formed by porous walls. The channels are open at both ends of the flow-through substrate. The exhaust gas thus flows from the inlet region to the outlet region and contacts the catalytically active material applied to the walls.

In addition to the gaseous pollutants, the exhaust gas of such combustion engines also contains extremely fine particles (PM) which result from the incomplete combustion of the fuel and substantially consist of soot. In contrast to the particle emission of diesel engines, the particles in the exhaust gas of stoichiometrically operated combustion engines, such as gasoline engines, are very small and have an average particle size of less than 1 μm. Typical particle sizes range from 10 to 200 nm. Furthermore, the quantity of particles emitted is very low and ranges from 2 to 4 mg/km.

Particle filters made of ceramic materials, such as silicon carbide, aluminum titanate and cordierite, have proven themselves in the field of purifying exhaust gases from lean-burn engines, i.e., in particular diesel engines. These wall-flow filters are made up of a large number of parallel channels formed by porous walls. The channels are alternately closed at one of the two ends of the filter so that channels A, which are open at the first side of the filter and closed at the second side of the filter, and channels B, which are closed at the first side of the filter and open at the second side of the filter, are formed. For example, exhaust gas flowing into channels A can only leave the filter via channels B and must flow through the porous walls between channels A and B for this purpose. When the exhaust gas passes through the wall, the particles are retained and the exhaust gas is cleaned. Such assemblies are referred to as wall-flow filters.

The particles retained in this manner must subsequently be burnt off or oxidized in order to prevent a clogging of the filter or an unacceptable increase in the back pressure of the exhaust system. For this purpose, the wall-flow filter can, for example, be provided with catalytically active coatings that reduce the ignition temperature of soot. Applying such coatings to the porous walls between the channels (so-called on-wall coating) or introducing them into the porous walls (so-called in-wall coating) is already known. EP1657410A2 also already describes a combination of both coating types; that is, part of the catalytically active material is present in the porous walls and another part is present on the porous walls.

The concept of removing particles out of the exhaust gas using wall-flow filters has already been applied to the purification of exhaust gas of combustion engines operated with a stoichiometric air/fuel mixture; see, for example, EP2042226A2 (gasoline particle filter; GPF). According to its teaching, a wall-flow filter comprises two layers arranged one above the other, wherein one can be arranged in the porous wall and the other can be arranged on the porous wall.

Since the Euro 6c stage took effect in September 2017, European emissions legislation has been stipulating exhaust gas measurements under real driving conditions (Real Driving Emissions; RDE). Depending upon driving conditions, this can mean that the catalyst will have to meet much higher demands-particularly with respect to the dynamic conversion of carbon monoxide and nitrogen oxides. In the currently applicable exhaust gas standards, the limit values of the Euro 6d standard under RDE conditions must also be observed for all new vehicles for the pollutants such as HC, CO, NOx and particles. In addition, a certain $CO_2$ limit value should not be exceeded across the fleet of vehicles. Especially with regard to secondary emissions, such as $N_2O$ and $NH_3$, future exhaust gas standards in Europe and the world will place even more demanding requirements on internal combustion engines and exhaust gas treatment.

It can be assumed that simple catalysts and/or filters are no longer sufficient for such standards. Therefore, more complex exhaust systems are also required in the technical field of predominantly stoichiometrically-operated combustion engines. By way of example, reference is made to EP3639919A1, in which an exhaust system consisting of a first TWC followed by a GPF and a further TWC on the downstream side of the GPF was proposed. These systems must be able to ensure sufficient catalytic activity and filtration efficiency with the lowest possible exhaust gas backpressure. In particular, the exhaust gas backpressure of a corresponding system leads to an increased consumption of fuel, which has a negative effect on the $CO_2$ balance. In addition, in future exhaust gas standards, more and more secondary emissions, such as toxic $NH_3$ or climate-damaging $N_2O$ will be targeted. All these aspects should be able to address a corresponding future exhaust system.

There is therefore still a need for exhaust gas purification systems for combustion engines predominantly operated with stoichiometric fuel mixtures which are able to eliminate all required harmful components of the exhaust gas of these motors in the best possible manner, and at the same time require the lowest possible consumption of fuel.

These and further problems arising from the prior art for a person skilled in the art are achieved by the exhaust system according to the present invention. As a result of the fact that in an exhaust gas purification system for purifying exhaust gases of a predominantly stoichiometrically operated internal combustion engine having a TWC1 close to the engine on a flow-through substrate, a GPF attached downstream of the TWC1, as a wall-flow filter, and downstream of the GPF a further TWC2 on a flow-through substrate, and the system is modified in such a way that it additionally has materials for temporarily storing hydrocarbons, the problem to be addressed is extremely surprisingly and advantageously solved.

According to the invention, the term "temporarily" is understood to mean that the material can store hydrocarbons in certain operating states of the exhaust system, and under other conditions, releases or no longer absorbs them. The storage material itself is not changed in the process. For example, the material can store the hydrocarbons present in the exhaust gas at low temperatures, and release or convert them at elevated temperatures (see further below). Thus, the storage material is then available again for further storage of hydrocarbons.

The establishment of a material for storing hydrocarbons in the system shown above represents an optimal combination of four functional exhaust gas cleaning components which allows future exhaust gas limit values to be met, and, furthermore, opens up the possibility of realizing a high degree of pollutant reduction in the system. As a result of the additional memory function, hydrocarbons that are not converted in the exhaust gas can be intercepted and stored in particular at low temperatures. Thus, they do not enter the environment. If the operating states of the exhaust gas purification system allow it, the hydrocarbons can be desorbed again, in particular at higher exhaust gas temperatures, and, for example, oxidized via a TWC to water and carbon dioxide.

Materials for storing hydrocarbons are also called hydrocarbon traps (HCT). The HCTs used preferably take up from the exhaust gas the emitted hydrocarbons at low temperatures of less than 300° C., preferably less than 350° C. (more is stored at this temperature than emitted). The HCT can be combined with an oxidative catalyst. The hydrocarbon storage capacity is preferably determined in the fresh state. The storage capacity of the materials used for hydrocarbons can be determined in accordance with the procedure described in the literature mentioned. The hydrocarbon storage capacity discussed in the context of this invention is specified as a ratio of stored hydrocarbon mass per liter of substrate volume. Tests for determining the hydrocarbon storage capacity are sufficiently known to a person skilled in the art and are described in the literature, for example in Lupescu et al., "A New Catalyzed HC Trap Technology that Enhances the Conversion of Gasoline Fuel Cold-Start Emissions," *SAE Int. J. Fuels Lubr* 11 (4): 411-425, 2018.

Due to the additional material for temporarily storing hydrocarbons, the hydrocarbon storage capacity of the exhaust gas purification system should be increased to at least 0.02 g of hydrocarbons per L substrate volume (measured in the fresh state). Overall, the storage capacity of the hydrocarbon storage components used should be sufficient to store between 0.02 and 7.0 g of hydrocarbons per liter of substrate volume, preferably between 0.05 and 6.0 g of hydrocarbons per liter of substrate volume, and particularly preferably between 0.08 and 5.0 g of hydrocarbons per liter of substrate volume in the system (always based on the fresh state and the substrate on which the materials are located). These materials temporarily storing the hydrocarbons are present in a sufficient amount in the exhaust system. A value of 50-350 g/L, preferably 75-300 g/L, and very preferably 100-250 g/L substrate volume has proven to be preferred. The volume of the substrate on which the storage material is situated is used as the substrate volume.

Materials familiar to the person skilled in the art can be used for temporary storage of hydrocarbons. Such compounds, selected from the group comprising zeolites, such as mordenites (MOR), Y-zeolites (FAU), ZSM-5 (MFI), ferrierites (FER), chabazites (CHA), AEI, LEV, and β-zeolites (BEA), as well as zeolite-like materials, such as aluminum phosphate (AIPO) and silicon aluminum phosphate SiAlPO, or mixtures thereof, can be used (EP0324082A1). Materials which have proven particularly advantageous for storing $NH_3$ are named in US 2006/0010857 AA and WO2004076829A1. Particularly preferably used are ZSM-5 (MFI), chabazite (CHA), ferrierite (FER), SAPO-34, and β-zeolites (BEA). Especially preferably used are CHA, BEA and AIPO-34 or SAPO-34. Extremely preferably used are BEA type materials. These materials are provided, in order to ensure improved storage activity, preferably with one or more metals from the group consisting of iron, copper, cesium, cerium, lanthanum, nickel, manganese, silver, and palladium. It should be mentioned in this respect that iron is especially advantageous. The person skilled in the art knows how the zeolites or zeolite-like materials are provided with the transition metals (PCT/EP2012/061382, and the literature cited therein) in order to be able to provide good activity with respect to the storage of hydrocarbons.

The term "zeolite" refers to porous materials with a lattice structure of corner-connected $AlO_4$ and $SiO_4$ tetrahedrons according to the general formula (W. M. Meier, *Pure & Appl. Chem.*, Vol. 58, No. 10, pp. 1323-1328, 1986):

$$M_{m/z}[m\ AlO_2 * n\ SiO_2] * q\ H_2O$$

Thus, the structure of a zeolite consists of a grid that is made of tetrahedrons and surrounds channels and cavities. A distinction is made between naturally occurring and synthetically produced zeolites.

In the context of this document, the term "zeolite-like compound" is understood to mean a compound which has the same structure type as a naturally occurring or synthetically-produced zeolite compound, which, however, differs from those in that the corresponding cage structure is not composed exclusively of aluminum and silicon background atoms. In such compounds, the aluminum and/or silicon backbone atoms are proportionately replaced by other trivalent, tetravalent, or pentavalent backbone atoms, such as B(III), Ga(III), Ge(IV), Ti(IV), or P(V). In practice, the most common usage is the replacement of aluminum and/or silicon backbone atoms by phosphorus atoms, for example in the silicon aluminum phosphates or in the aluminum phosphates, which crystallize into zeolite structure types. Prominent examples are the silicon aluminum phosphate SAPO-34 crystallized in chabazite structure and the aluminum phosphate AlPO-34 crystallized in chabazite structure.

The particular advantage of the use according to the invention of transition metal-substituted zeolites or zeolite-like compounds is the possibility that these substances, as already mentioned above, scour the unburned hydrocarbons at lower temperatures, for example in so-called cold-start mode, and then release them again only at elevated temperatures. At these temperatures, catalysts for oxidizing hydrocarbons are then heated to such an extent that they can oxidize the desorbed hydrocarbons accordingly to water and carbon dioxide. In particular when using the materials which temporarily store hydrocarbons on a separate flow-through substrate, it is advantageous if these materials likewise have catalysts for oxidizing hydrocarbons to $H_2O$ and $CO_2$. Reference is made to the statements made further below regarding this point.

The material temporarily storing the hydrocarbons can be distributed in the exhaust gas purification system on a unit or the units already present. In this case, the corresponding material can be present in relation to the catalytically active materials which may already be present, together with them, or separately therefrom in zones or layers on one or more substrates. As such, it is reasonable to locate the material temporarily storing the hydrocarbons on the TWC2. If hydrocarbons should be present in certain operating states after the TWC1 is greater quantities, these can be stored or converted accordingly in the TWC2 positioned downstream. Since the TWC2 is correspondingly further removed from the engine outlet, the temperature load there is moderate, which facilitates better storage. If the TWC2 located in the underbody is then heated to operating temperature, the stored hydrocarbons are desorbed and converted via the TWC2 to $CO_2$ and water. In this way, thermal damage of the material temporarily storing the hydrocarbons is also prevented as much as possible.

However, alternatively, the material temporarily storing the hydrocarbons can also be arranged on a separate flow-through substrate. In this case, this flow-through substrate (CAT) can be arranged in the exhaust gas purification system according to aspects known to a person skilled in the art (see FIGS. 2-4). An arrangement is preferred in which the CAT is arranged on the downstream side of the TWC2. The advantages are the same as mentioned above for the location of the corresponding material on the TWC2. Thus, the CAT—like the TWC2—is preferably located in the underbody of the vehicle. Alternatively, however, the CAT can also be situated on the upstream side of the TWC2 or downstream of the TWC1 and upstream or downstream of the GPF. In particular, in this last-mentioned combination, it appears to be advantageous if the CAT is arranged at a distance of 30-250 cm, preferably 40-200 cm and very preferably 50-180 cm downstream of the output of the TWC1. Very particular preference is given to the siting of the CAT in the underbody of the vehicle.

In general, it has proven to be advantageous if the individual substrates of the exhaust gas purification system according to the invention (TWC1, GPF, TWC2, CAT) are in a certain ratio to one another with regard to the volume that they take up. It is thus advantageous if the TWC1 assumes a proportion of the volume of the overall system which is between 20 and 50 vol. %, preferably 30 to 40 vol. %. The GPF should have a volume fraction of 20-60% by volume, preferably 25-55% by volume, based on the overall system. Likewise, the proportion of TWC2 of the overall system should be 10-40% by volume, preferably 15-35% by volume. The CAT comprising the material for temporarily storing nitrogen oxides has a proportion of preferably 5-30% by volume, more preferably 10-30% by volume, of the total volume of the substrates in the exhaust gas purification system. The term "overall system" is understood here to mean the sum of the volumes of the substrates of TWC1, GPF, TWC2 and CAT.

The CAT has a relatively high washcoat loading in g/L, which ranges from 100-500 g/L, preferably 125-450 g/L, and very preferably 150-400 g/L. In one embodiment, the structure of the CAT corresponds to that of the oxidation catalyst. The latter has an oxidative function in order to be able to oxidize hydrocarbons in the exhaust gas. For such catalysts, it has proven to be advantageous if these are present in a zoned and/or layered structure. For example, the CAT can have an upper layer applied to the substrate with an oxidation function for the oxidation of hydrocarbons and, under this layer, at least partially have a further layer with the material temporarily storing the hydrocarbons. Alternatively, the CAT can have a lower layer with an oxidation function, over which the material temporarily storing the hydrocarbons is applied in an upper layer. In a further alternative embodiment, the temporary storage function and the oxidation function can also be present completely or partially in the same layer, and optionally additionally have a further layer with an oxidation function. Another possibility is to apply the temporary hydrocarbon storage function and the oxidation function to different substrates. In particular, the design and materials of US20190351397AA, US20190351398AA or US20190351393AA are suitable as configurations with regard to the design and materials for the HCT.

The material temporarily storing the hydrocarbons can be designed as described above. The zeolites of CHA, BEA or AEI substituted with copper or iron and/or palladium have proven to be particularly preferred in this case. BEA substituted with iron, or iron and palladium, is particularly preferred. The oxidation function is essentially provided by the metals Rh, Pt and/or Pd, preferably Pt and/or Pd or Rh or Rh and Pd, which in one embodiment are supported on active aluminum with high surface area. Active aluminum contains up to 10% by weight, based on the aluminum oxide, of lanthanum and/or $SiO_2$ as admixture. In an alternative but yet preferred embodiment, the oxidative function is provided by Rh, and/or Pd, and/or Pt which are supported on a mixture of high-surface-area aluminum oxide and common oxygen storage materials such as cerium oxides, cerium-zirconium mixed oxides, or La, Y, Pr, Nd-doped cerium or cerium-zirconium mixed oxides. Due to the design of the CAT, the application and selection of the noble metals, the oxidative effect of the oxidative coating can be readily balanced to be able to exert a sufficient oxidative effect on the hydrocarbons.

It can also be advantageous if materials temporarily storing the hydrocarbons on the CAT are also paired with materials capable of storing oxygen. The latter are the oxygen storage materials which are usually used in the TWCs. These create an oxygen-rich environment which is advantageous for the oxidation of hydrocarbons. Corresponding materials are described, inter alia, in EP2007682A1, EP1921044A2, U.S. Pat. Nos. 6,468,941B1, 6,585,944B1 and US20050282698A1. Preference is given in this respect to cerium oxides, cerium-zirconium mixed oxides or to La, Y, Pr, Nd-doped cerium or cerium-zirconium mixed oxides. The amount of oxygen-storing material can be adjudged by a person skilled in the art, but should not be below 0.1 g/g, preferably 0.20 g/g, based on the weight of the material temporarily storing the hydrocarbons.

TWC1 and TWC2 are modern three-way catalysts. A person skilled in the art is aware of which one they would use for the present purpose (see, for example, WO2019121994A1, WO2019121995A1, WO9535152A1, WO2008000449A2, EP0885650A2, EP1046423A2, EP1726359A1, EP1541220A1, EP1900416B1, EP3045226A1, WO2009012348A1, and EP1974809B1). Three-way catalysts consist essentially of the components: precious metal, high-surface-area carrier oxide, and oxygen-storing material. The oxygen storage materials are in particular those in which cerium/zirconium/rare earth metal mixed oxides occur. Lanthanum oxide, yttrium oxide, praseodymium oxide, neodymium oxide, samarium oxide, and mixtures of one or more of these metal oxides may, for example, be considered the rare-earth metal oxide. Lanthanum oxide, yttrium oxide, neodymium oxide, and mixtures of one or more of these metal oxides are preferred. Particularly preferred are lanthanum oxide and yttrium oxide, and a mixture of lanthanum oxide and yttrium oxide is quite particularly preferred in this context.

For a person skilled in the art, high-surface-area, temperature-stable oxides are suitable carrier oxides for these catalytically-active metals. As a rule, these are aluminum oxides, silicon oxides, zirconium oxides, or titanium oxides, or mixtures thereof. Active aluminum oxide in particular is known to a person skilled in the art in this context. It particularly describes γ-aluminum oxide with a surface of 100 to 200 m$^2$/g. Active aluminum oxide is frequently described in the literature and is commercially available. It generally contains silicon oxide or lanthanum oxide as a stabilizer in an amount of up to 10 wt % relative to the aluminum oxide.

Three-way catalytic converters for the most part contain platinum group metals, such as Pt, Pd, and Rh, as catalytically active components, wherein Pd and Rh are particularly preferred. The catalytically-active metals are often deposited so as to be highly dispersed on the high-surface-area oxides and the oxygen storage materials. It is particularly preferred for the precious metals to be pre-fixed on the oxygen storage material before it is mixed with the other components into the coating mixture. With the TWC's, a zoned or layered embodiment is now the standard. In a preferred embodiment, at least one of the TWC1s has a 2-layer structure with two different three-way coatings-preferably as described in EP3247493A1.

The three-way catalysts are preferably applied to a flow-through substrate by a coating step familiar to the person skilled in the art. Flow-through substrates are conventional catalyst substrates in the prior art, which can consist of metal (corrugated carrier, for example WO17153239A1, WO16057285A1, WO15121910A1 and literature cited therein) or ceramic materials. Refractory ceramics, such as cordierite, silicon carbide or aluminum titanate, etc., are preferably used. The number of channels per area is characterized by the cell density, which typically ranges between 300 and 900 cells per square inch (cpsi). The wall thickness of the channel walls in ceramics is between 0.5-0.05 mm.

According to the invention, the TWC1 is preferably installed near the engine. This means that only 1-40 cm distance exists between the turbocharger and the inlet-side end face of the TWC1. The catalyst TWC1 2-30 cm and very preferably 3-20 cm is preferably installed remote from the turbocharger. The GPF can be installed at a distance from the TWC1, for example in the underbody of the vehicle. However, the embodiment in which the GPF is installed rather close to the outlet-side end of the TWC1 is preferred. The distance between the outlet-side end face of the TWC1 and GPF is preferably 1-60 cm, more preferably 2-50 cm, and very preferably 3-40 cm. The TWC2 is either installed directly after the filter in a position close to the engine, or preferably is used in the underbody of the vehicle in the exhaust system. As a result, the temperature load of this TWC is different than that of the TWC1. For this reason, the two TWCs differ in some characteristics. The TWC2 preferably has a lower washcoat loading than the TWC1. Preferably, the TWC1 consists of at least 2-4 different three-way catalyst layers or zones, while the TWC2 preferably consists of at least 1-2 three-way catalyst layers or zones. In a further embodiment, it has proven to be advantageous if the washcoat loading in g/L of the TWC1 is greater than that of the TWC2, in particular by a factor of between 1.25-4, more preferably 1.5-3. In addition, the noble metal concentration on the TWC1 is preferably greater than in the TWC2, in particular by a factor of 1.25-20, more preferably 1.5-10. The TWCs have a customary washcoat loading. This is preferably 100-400 g/L, more preferably 125-375 g/L and most preferably 150-325 g/L.

The GPF has the shape of a wall-flow filter. All ceramic materials customary in the prior art can be used as wall-flow filters. Porous wall-flow filter substrates made of cordierite, silicon carbide, or aluminum titanate are preferably used. These wall-flow filter substrates have inflow and outflow channels, wherein the respective downstream ends of the inflow channels and the upstream ends of the outflow channels are alternately closed off with gas-tight "plugs." The exhaust gas that is to be purified and that flows through the filter substrate is thereby forced to pass through the porous wall between the inflow channel and outflow channel, which delivers an excellent particulate filtering effect. The filtration property for particulates can be designed by means of the porosity, pore/radii distribution, and thickness of the wall. The porosity of the wall-flow filters is generally more than 40%, generally from 40% to 75%, and particularly from 45% to 70% [as measured in accordance with DIN 66133, latest version on the filing date]. The average pore size (diameter) is at least 3 μm—for example, from 3 μm to 34 μm, preferably more than 5 μm, and in particular from 5 μm to 28 μm, or from 7 μm to 22 μm [measured according to DIN 66134, latest version on the date of application].

The GPF can be used uncoated, with a dry powder coating, or with an optionally additional, wet-produced coating in the system according to the invention (EP3595796A1, WO2020200394A1, WO2020200397A1). Corresponding wet-produced filters with improved filtering effect are presented in WO2019121375A1 or WO2020200398A1 or PCT/EP 2019/057995. Alternatively or cumulatively, a coating with a dry powder can also be contemplated (see, for example, DE102018108346A1, U.S. Pat. No. 8,277,880B2). Most of all, such coatings improve the filtration efficiency of the filter without impairing the exhaust gas backpressure of the filter beyond specifications. However, the GPF can also accommodate a catalytic coating. A catalyst material can be applied in the form of a coating suspension to and/or into the porous walls of the inlet and/or outlet channels. In the present case, it is generally a coating with a three-way catalytic converter. The composition corresponds to the statements made above. All the assemblies in the exhaust gas purification system according to the invention can thus have catalytically active noble metals of the provenance specified above. In an advantageous embodiment, the GPF has a higher noble metal concentration in g/L of substrate volume than the TWC2. If present, it is advantageous if the CAT has a higher noble metal concentration in g/L of substrate volume than the TWC2. However, both mentioned embodiments can also be the opposite, depending on the application. In a special case, the TWC2 can be designed such that it only has rhodium as a noble metal.

If the GPF is provided with a coating, the washcoat loading is 10-200 g/L, preferably 20-175 g/L, and very preferably 25-150 g/L. It is advantageous here if the substrate with the materials for temporarily storing ammonia (CAT) has a greater washcoat loading in g/L than the GPF.

"Electrically heated catalysts" (EHC) are special catalyst bodies which can be heated by applying a power source. The advantage of such systems is that operating states of the exhaust gas purification system in which the catalysts are not or are no longer sufficiently active due to low temperatures are prevented. Such operating states mostly exist when the vehicle has just been started. By rapid electrical heating of the catalyst substrates, the catalysts located thereon can be brought to conversion temperature and thus the emission of unconverted pollutants can be reduced. In the present case, it is particularly advantageous if at least one of the catalyst substrates (TWC1, GPF, TWC2 or CAT) present in the system is an electrically heatable substrate. It is very preferred if this is the TWC1. Due to its positioning in the system, it is the first to be at the working temperature. The use of current here is therefore lowest, which is extremely preferred especially with regard to hybrid application, since the battery can be saved. Corresponding EHC systems in hybrid vehicles are known to a person skilled in the art (U.S. Pat. No. 8,776,500BB).

In order to further reduce the pollutants which are emitted by the vehicle, a so-called ammonia storage catalyst can be located in the exhaust gas purification system according to the invention, preferably before, after, or in the TWC2 as viewed in the direction of flow of the exhaust gas. In the system, this can be used to reduce potentially-developing ammonia before it is released to the environment. The ammonia is temporarily stored and can be oxidized either with oxygen or any nitrogen oxide present. This results in nitrogen and water. Materials familiar to the person skilled in the art can be used for temporary storage of ammonia. Such compounds, selected from the group comprising zeolites, such as mordenites (MOR), Y-zeolites (FAU), ZSM-5 (MFI), ferrierites (FER), chabazites (CHA), AEI, LEV, and β-zeolites (BEA), as well as zeolite-like materials, such as aluminum phosphate (AlPO) and silicon aluminum phosphate SiAlPO, or mixtures thereof, can be used (EP0324082A1). Materials which have proven particularly advantageous for storing $NH_3$ are named in US 2006/0010857 AA and WO2004076829A1. Particularly preferably used are ZSM-5 (MFI), chabazite (CHA), ferrierite (FER), SAPO-34, and β-zeolites (BEA). Especially preferably used are CHA, BEA and AlPO-34 or SAPO-34. Extremely preferably used are materials of the CHA type, and here, maximally preferably, SSZ-13. In order to ensure improved activity, these materials are preferably provided with transition metals from the group consisting of iron, copper, manganese, and silver. It should be mentioned in this respect that copper is especially advantageous. The person skilled in the art knows how the zeolites or zeolite-like materials are provided with the transition metals (PCT/EP2012/061382, and the literature cited therein) in order to be able to provide good activity with respect to the reduction of nitrogen oxides with ammonia.

The storage capacity of the substrate for ammonia can be determined in accordance with the following procedure. The ammonia storage capacity discussed in the context of this invention is specified as the ratio of stored ammonia mass per liter of catalyst volume. It is determined experimentally in a stream pipe reactor. In order to avoid undesirable ammonia oxidation on the reactor material, a reactor made of quartz glass is used. From the region of the catalyst whose ammonia storage capacity is to be determined, a drill core is taken as specimen. A drill core having a diameter of 1 inch and a length of 3 inches is preferably removed as the test object. The drill core is inserted into the flow tube reactor and conditioned at a temperature of 600° C. in a gas atmosphere of 500 ppm of nitrogen monoxide, 5% by volume of oxygen, 5% by volume of water, and the remainder of nitrogen at a space velocity of 30,000 $h^{-1}$ for 10 minutes. Subsequently, the measuring temperature of 200° C. is set in a gas mixture of 0% by volume of oxygen, 5% by volume of water, and the remainder of nitrogen at a space velocity of 30,000 $h^{-1}$. After stabilization of the temperature, the $NH_3$ storage phase is initiated by introducing a gas mixture of 450 ppm ammonia, 0% by volume oxygen, 5% by volume water, and the remainder nitrogen at a space velocity of 30,000 $h^{-1}$. This gas mixture is added until a stationary ammonia permeate concentration is registered downstream of the specimen. The $NH_3$ concentration measured after the catalyst may also be under the metered $NH_3$ concentration. The mass of ammonia stored on the test object is calculated from the recorded ammonia permeate curve by integration from the start of the $NH_3$ storage phase until stationarity is reached, taking into account the measured steady-state $NH_3$ permeate concentration and the known volume flow (hatched area in FIG. 1). The ammonia storage capacity is calculated as quotient of the stored ammonia mass divided by the volume of the tested drill core. The ammonia storage capacity of the exhaust gas purification system should be increased to at least 0.25 g ammonia per L substrate volume by the additional material for storing ammonia. Overall, the storage capacity of the ammonia storage components used should be sufficient so that between 0.25 and 3.5 g $NH_3$ per liter of substrate volume, preferably between 0.5 and 2.2 g of $NH_3$ per liter of substrate volume, and particularly preferably between 0.5 and 2.0 g $NH_3$/liter of substrate volume ammonia can be stored in the system.

The material for temporary storage of ammonia can at the same time be capable of comproportionating nitrogen oxides present in the exhaust gas and the stored ammonia to form nitrogen. In this case, the ammonia store acts as a catalyst for the selective catalytic reduction (SCR; WO2008106518A2). Furthermore, it can be advantageous if a function for oxidizing ammonia to nitrogen is also added to this SCR catalyst (WO2008106519A1). It is therefore advantageous that the materials for temporarily storing ammonia likewise have catalysts for the oxidation of $NH_3$ to $N_2$. As such, this is an ammonia oxidation catalyst (AMOX) or an ammonia blocking catalyst (U.S. Pat. No. 5,120,695; EP1892395A1; EP1882832A2; EP1876331A2; WO12135871A1; US2011271664AA; WO11110919 A1). If insufficient nitrogen oxides should be present in the system for the oxidation of the stored ammonia, the ammonia can also be converted via AMOX into nitrogen with oxygen present. In both cases—as an SCR catalyst or AMOX—ammonia is not released to the environment.

It is also advantageous if a functionality for temporarily storing nitrogen oxides is present in the exhaust gas purification system according to the invention. In this way, it can be prevented that too many unreacted nitrogen oxides are emitted during the so-called cold-running phases of the vehicle. These are then stored and subsequently reduced later when sufficient temperature and reducing agent is present in the exhaust system, either by reductive regeneration (so-called NOx storage catalysts; NSC) or by thermal desorption (passive NOx storage, PNA) and reduction via a three-way catalyst. With regard to the mode of action and the materials preferably to be used, reference is made to the relevant literature (WO2020058265A1; EP3695902A1; US2019120109AA; US2018318763AA; US2015266002AA; WO2019134958A1).

The present invention also provides a method for purifying exhaust gases of a predominantly stoichiometrically operated internal combustion engine, in which the exhaust gas is conveyed through an exhaust gas purification system according to any of the preceding claims. The preferred and alternative embodiments mentioned for the system also apply mutatis mutandis to the method.

With the exhaust system and the proposed method according to the present invention, it is possible to be able to comply with the exhaust gas limit values of future, even-stricter exhaust standards. In addition to the standard values, such as HC, CO, NOx, and soot, the system according to the invention also makes it possible, at least in its advantageous embodiments, to reduce so-called secondary pollutants, e.g., $NH_3$, $N_2O$, and others. Specifically, the arrangement of the TWC1 close to the engine enables very high conversion rates for the emission-relevant pollutants CO, HC, and NOx. The additional TWC2 can optionally have a support effect and can help to ensure high conversion rates of CO, HC, and NOx most importantly at operating points with high load and exhaust gas mass flows. By contrast, the use of the particle filter leads to significant deposition rates of soot, so that the given emission limits can be reliably met. It is well known to the person skilled in the art that classic three-way catalysts in the corresponding temperature regimes and engine operating points cannot completely oxidize certain amounts of hydrocarbons. Finally, by using CAT, it is ensured that hydrocarbons formed in the cold start can additionally be significantly reduced. Such a system is thus predestined for use in automobiles which must comply with future strict exhaust gas limit values for approval.

FIG. 1: The typical concentration curve of an ammonia absorption measurement is shown here.

Figure 2:

FIG. 2: shows an embodiment of a system according to the invention with CAT downstream of the TWC2.

Figure 3:

FIG. 3: shows an embodiment of a system according to the invention with CAT between GPF and TWC2.

Figure 4:

FIG. 4: shows an embodiment of a system according to the invention with CAT on the inflow side of the GPF.

Figure 5:
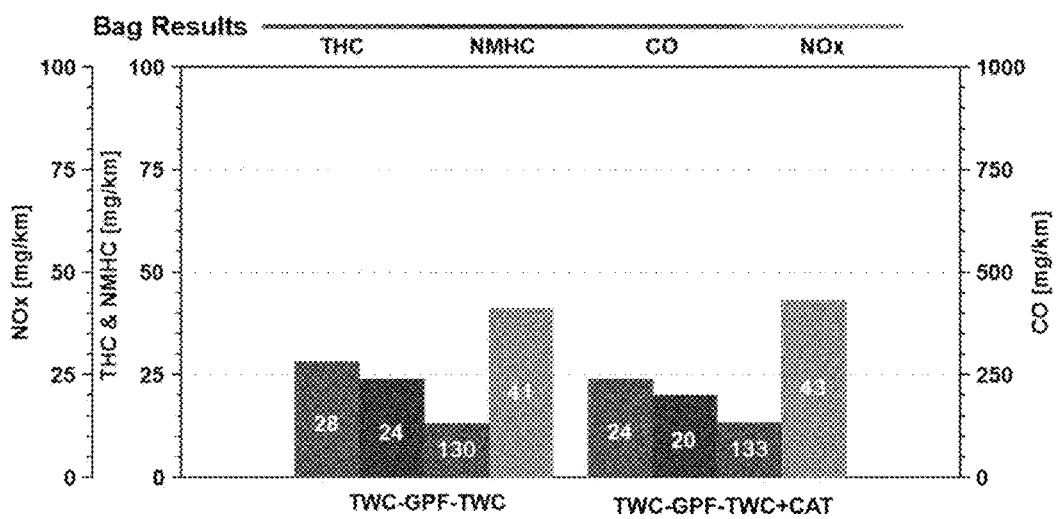

FIG. 5: shows average bag emissions for THC/NHC/CO/NOx of the two exhaust gas aftertreatment systems TWC-GPF-TWC and TWC-GPF-TWC+CAT in comparison.

Figure 6:
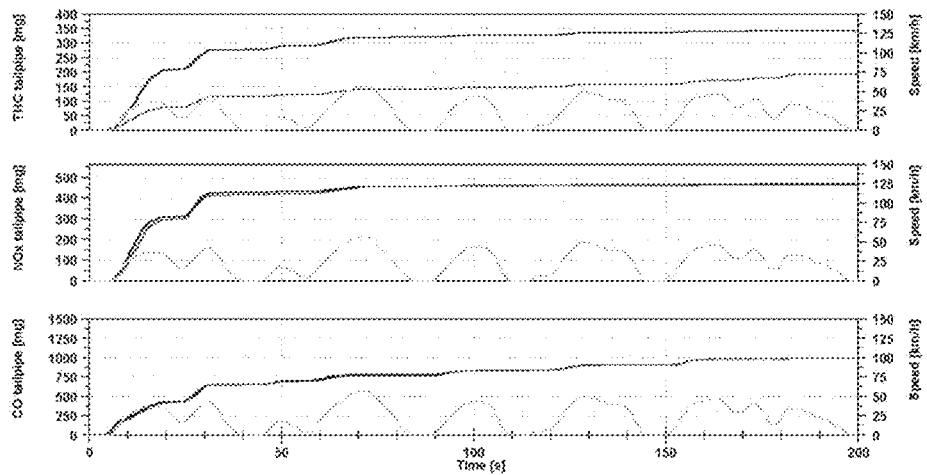

FIG. 6: shows mediated cumulative modal curves of HC, CO, and NOx during the first 200 s of the driving cycle.

EXAMPLES: EXPERIMENTAL DATA

A Euro 6 gasoline vehicle with 1.5 L DI engine was run with an exhaust system artificially aged to end of life, consisting of a first TWC close to the engine with 1.26 L catalyst volume (substrate dimensions 118.4 mm×114.3 mm) and a conventional three-way coating with 1.77 g/L noble metal (0/92/8 Pt/Pd/Rh), an uncoated GPF arranged downstream with 1.39 L catalyst volume (substrate dimensions 132.1 mm×101.6 mm) and a second TWC arranged in the underbody with 1.26 L catalyst volume (substrate dimensions 118.4 mm×114.3 mm) and a conventional three-way coating with 0.83 g/L noble metal (0/80/20 Pt/Pd/Rh), on an RTS roller test bench with an aggressive driving profile. This system is referred to as a TWC-GPF-TWC reference system, and has a total substrate volume of 3.9 L. The emissions THC, NNHC, CO, NOx, $NH_3$ and $N_2O$ were measured in this case; the measuring technology to be used for this purpose is known to the person skilled in the art. The mean value from a plurality of measurements is shown in each case.

This was compared to a system according to the claims in this application. For this purpose, the same Euro 6 gasoline vehicle with 1.5 L DI Motor was driven with an exhaust system artificially aged to end of life, consisting of a first TWC close to the engine with 1.26 L catalyst volume (substrate dimensions 118.4 mm×57.2 mm) and a conventional three-way coating with 1.77 g/L noble metal (0/92/8 Pt/Pd/Rh), an uncoated GPF arranged downstream with 1.39 L catalyst volume (substrate dimensions 132.1 mm×101.6 mm), a second TWC arranged in the underbody with 0.63 L catalyst volume (substrate dimensions 118.4 mm×57.2 mm) and a conventional three-way coating with 0.83 g/L noble metal (0/80/20 Pt/Pd/Rh), and a CAT, arranged downstream thereof, with a 0.63 L catalyst volume (substrate dimensions 118.4 mm×57.2 mm) and a coating which can additionally temporarily store hydrocarbons, with 0.83 g/L noble metal (0/80/20 Pt/Pd/Rh) on an RTS roller test bench with an aggressive driving profile. This system is referred to as TWC-GPF-TWC+CAT and has a total substrate volume of 3.9 L. The emissions THC, NNHC, CO, NOx, $NH_3$ and $N_2O$ were measured in this case; the measuring technology to be used for this purpose is known to a person skilled in the art. The mean value from a plurality of measurements is shown in each case.

FIG. 5 shows the advantages of the TWC-GPF-TWC+CAT system compared to TWC_GPF_TWC reference system in a reduction of THC and NMHC emissions by 15% without negatively influencing the CO or NOx emissions. The advantages for the HC emissions are even more clearly shown in FIG. 6, where the averaged cumulative modal curves of HC, CO, and NOx are shown during the first 200 s of the driving cycle. Here, the HC emissions can be reduced by the TWC-GPF-TWC+CAT system by more than one third compared to the TWC-GPF-TWC reference system, even though there is no negative influence on the CO or NOx performance. This effect is achieved with the same overall substrate volume of the two compared systems, i.e., with halved TWC2 of the TWC-GPF-TWC+CAT system compared to that of the TWC-GPF-TWC reference system. With the same volume of the TWC2 in both systems, therefore, an even more amplified advantage for the TWC-GPF-TWC+CAT system is to be expected.

The invention claimed is:

1. An exhaust gas purification system for purifying exhaust gases of a predominantly stoichiometrically operated internal combustion engine, the system comprising: a three-way catalyst (TWC1) near the engine on a flow-through substrate, a gasoline particulate filter (GPF) attached downstream of the TWC1 as a wall-flow filter, and a further three-way catalyst (TWC2) on a flow-through substrate downstream of the GPF,
  wherein the system additionally comprises materials for temporarily storing hydrocarbons, and these are positioned on the downstream side of the TWC1 and behind the GPF,
  wherein the materials for temporarily storing hydrocarbons are arranged on a separate flow-through substrate, and
  wherein the substrate with the materials for temporarily storing hydrocarbons makes up a proportion of 5-30 vol. % of the total volume of the substrates in the exhaust gas purification system.

2. The system according to claim 1, wherein by this additional material, the hydrocarbon storage capacity is increased to at least 0.020 g of hydrocarbons per L substrate volume.

3. The system according to claim 1, wherein the materials for temporarily storing hydrocarbons are present in an amount of 50-350 g/L of substrate volume in the system.

4. The system according to claim 1, wherein the materials for temporarily storing hydrocarbons have materials selected from the group consisting of zeolites or zeolite-like materials.

5. The system according to claim 1, wherein the materials for temporarily storing hydrocarbons likewise have catalysts for the oxidation of hydrocarbons to $H_2O$ and $CO_2$.

6. The system according to claim 1, wherein the substrate with the materials for temporarily storing hydrocarbons has a greater washcoat loading in g/L than the GPF.

7. The system according to claim 1, further comprising an electrical heater element such that at least one substrate can be heated electrically.

8. A method for purifying exhaust gases of a predominantly stoichiometrically operated internal combustion engine, the method comprising:
  conveying the exhaust gas via the exhaust gas purification system according to claim 1.

9. The system according to claim 1, wherein the proportion of vol. % for each of the TWC1; GPF; TWC2 substrates, and the separate flow-through substrate (CAT), is, respectively, as follows: 20 to 50 vol. %; 20 to 60 vol. %; 10 to 40 vol. %; and 10-30 vol. %.

10. The system according to claim 9, wherein the proportion of vol. % for each of the TWC1; GPF; TWC2 and CAT substrates is, respectively, as follows: 30 to 40 vol. %; 25 to 55 vol. %; 10 to 35 vol. %; and 10-30 vol. %.

11. The system according to claim 1, wherein the separate flow-through substrate makes up a proportion of 10-30 vol. % of the total volume of the substrates in the exhaust gas purification system.

12. An exhaust gas purification system for purifying exhaust gases of a predominantly stoichiometrically operated internal combustion engine, the system comprising: a three-way catalyst (TWC1) near the engine on a flow-through substrate, a gasoline particulate filter (GPF) attached downstream of the TWC1 as a wall-flow filter, and a further three-way catalyst (TWC2) on a flow-through substrate downstream of the GPF,
  wherein the system additionally comprises an additional catalyst substrate (CAT) having materials for temporarily storing hydrocarbons, and the CAT is positioned downstream of each of the TWC1, GPF and TWC2, and
  wherein the substrate of the CAT makes up a proportion of 5-30 vol. % of the total volume of the substrates in the exhaust gas purification system.

13. The system according to claim 12, wherein the proportion of vol. % for each of the TWC1; GPF; and TWC2 substrates is, respectively, as follows: 20 to 50 vol. %; 20 to 60 vol. %; and 10 to 40 vol. %.

14. The system according to claim 12, wherein the proportion of vol. % for each of the TWC1; GPF; TWC2 and CAT substrates is, respectively, as follows: 30 to 40 vol. %; 25 to 55 vol. %; 10 to 35 vol. %; and 10-30 vol. %.

15. An exhaust gas purification system for purifying exhaust gases of a predominantly stoichiometrically operated internal combustion engine, the system comprising: a three-way catalyst (TWC1) near the engine on a flow-through substrate, a gasoline particulate filter (GPF) attached downstream of the TWC1 as a wall-flow filter, and a further three-way catalyst (TWC2) on a flow-through substrate downstream of the GPF,
  wherein the system additionally comprises an additional catalyst substrate (CAT) having materials for temporarily storing hydrocarbons, and the CAT is positioned upstream of the GPF, and
  wherein the CAT substrate makes up a proportion of 5-30 vol. % of the total volume of the substrates in the exhaust gas purification system.

16. The system according to claim 15, wherein the proportion of vol. % for each of the TWC1; GPF; and TWC2 substrates is, respectively, as follows: 20 to 50 vol. %; 20 to 60 vol. %; and 10 to 40 vol. %.

17. The system according to claim 16, wherein the proportion of vol. % for each of the TWC1; GPF; TWC2 and CAT substrates is, respectively, as follows: 30 to 40 vol. %; 25 to 55 vol. %; 10 to 35 vol. %; and 10-30 vol. %.

18. The system according to claim 15, wherein the CAT substrate makes up a proportion of 10-30 vol. % of the total volume of the substrates in the exhaust gas purification system.

* * * * *